Feb. 24, 1931.  L. T. RICHARDSON ET AL  1,793,830
MOLDED PRODUCT AND PROCESS OF FORMING THE SAME
Filed May 23, 1925
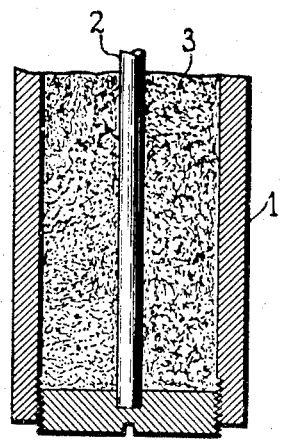
INVENTORS
Linwood T. Richardson
Edgar M. Schmiel
BY Franklin Hubbard
ATTORNEY Patented Feb. 24, 1931

1,793,830

UNITED STATES PATENT OFFICE

LINWOOD T. RICHARDSON, OF MILWAUKEE, WISCONSIN, AND EDGAR M. SCHMIEL, OF CHICAGO, ILLINOIS, ASSIGNORS, BY MESNE ASSIGNMENTS, TO CUTLER-HAMMER, INC., A CORPORATION OF DELAWARE

MOLDED PRODUCT AND PROCESS OF FORMING THE SAME

Application filed May 23, 1925. Serial No. 32,397.

This invention relates to molded products and process of forming the same.

More particularly, the invention relates to products formed from loose, non-cementitious material, as, for example, fused magnesium oxide, and has among its objects the conversion of a quantity of such material into a coherent mass without use of a binder or employment of a forming press.

Another object is to effect conversion of the loose material into a coherent mass of the desired shape by a simple chemical treatment.

Another object is to effect disintegration of the material into small particles in the process of converting the same into a coherent mass.

Another object is to provide a process applicable to various materials and capable of producing articles or parts for a wide variety of uses.

Another object is to enable the product when comprising a part of a unitary structure to be conveniently formed in situ.

Other objects and advantages of the invention will hereinafter appear.

According to the present invention, it is proposed to place the fused magnesium oxide or other material preferably in a granular state in a suitable enclosure inherently capable of withstanding a considerable internal pressure, or else suitably reinforced and then to subject the material to chemical reaction for disintegrating the material and producing therein pressures tending to expand the mass thereof. Also, it is proposed to utilize the enclosing form to restrict expansion of the mass thereby causing the pressures set up within the mass to redistribute the particles thereof with substantial uniformity and to render the mass coherent. Further, it is proposed to control the pressures set up within the mass by initially packing the loose material to varying degrees, or by mixing therewith a suitable quantity of chemically inert material or by controlling the chemical reaction.

The invention will now be further described, reference being had to the accompanying drawing which exemplifies the utility thereof and to some extent the process involved.

Referring to the drawing, the same shows a simple cylindrical form 1 plugged at its lower end, and having centrally supported therein a rod 2 surrounded by a filling 3 of loose material to be converted into a coherent mass. Thus, if it be assumed that both the form 1 and rod 2 are removable from the mass to be formed from the filling, the drawing will serve to exemplify production of a simple form of hollow article, whereas if it be assumed that the elements aforementioned including the filling are to remain assembled, the drawing will serve to exemplify forming of a part in situ.

The form 1 will be assumed to be capable of withstanding the pressures produced therewithin by treatment of the filling, but, as will be apparent, the form might be provided with thinner walls and merely reinforced during treatment as by a snugly fitting enclosing tube.

While the filling may comprise any of a number of materials, it will be assumed to comprise granular fused magnesium oxide. Also, it will be assumed that the magnesium oxide is more or less tightly packed between the form 1 and rod 2, this being the only preparation required for the treatment now to be described.

With a form such as illustrated, the process preferably comprises as its first step filling of the voids within the mass of loose magnesium oxide with a hydrating agent, preferably water, such filling being accomplished as by pouring or forcing water into the open end of the form. Or, if desired, the plug may be removed from the end of the mold and a vacuum pump attached to this end of the mold to draw in the water supplied at the opposite end of the mold, thorough wetting being desirable. However, it is to be understood that this step may be omitted where thorough wetting is obtainable as by the steam treatment hereinafter mentioned.

Thereupon the wet magnesium oxide is preferably subjected to heat and pressure, a convenient method being to place the mold in an autoclave and to subject the magnesium oxide to the action of steam preferably at a temperature substantially in excess of 212° F. for a suitable period of time. Under this treatment the magnesium oxide reacts and disintegrates with powerful expansive tendencies.

Thus, the expansion resisting mold causes the pressures set up therewithin to force the broken down particles of magnesium oxide into adjacent voids and to render the mass coherent. In this connection it may be stated that experiments have established that the pressures produced by such treatment of magnesium oxide are very high and are directed radially of the mold whereby the mass is rendered coherent without appreciable flow axially of the mold so that both ends of the mold may be left open without loss of material or loss of the advantages of the pressures thus obtained.

After so treating the magnesium oxide, which then becomes magnesium hydroxide, the same may be restored to its original chemical state without change in its apparent volume. This may be acomplished by subjecting the molded material to a high temperature, preferably, a red heat, to drive off all moisture, the material being thereupon restored to its original weight, but, as stated, without change in its apparent volume.

When it is desired to curtail the pressures resulting from such treatment of fused magnesium oxide or other material this may be accomplished by reducing the amount thereof introduced into the mold, and, if the pressures are excessive even when such material is very loosely packed, further reduction may be effected by mixing with the material a proper proportion of a chemically inert substance, as, for example, alundum. Also, the pressures may be reduced by limiting the extent of hydration either by shortening the period of treatment or by limiting the supply of hydrating agent available for reaction. However, the methods involving complete hydration have the advantage of rendering the final product immune to further expansive effects of moisture.

It is, of course, to be understood that any other material capable of the treatment aforedescribed with similar results may be used in lieu of fused magnesium oxide and that reagents other than water or steam which are capable of bringing about disintegration and cohesion of the particles of the mass may be used. Also, it is to be understood that fused magnesium oxide is preferred merely because of its increased density as compared with other commercially pure oxides and that it is immaterial whether or not the material is fused to the usual extent or in fact to any extent if the density thereof is such as to adapt it to the use aforedescribed.

As aforeindicated, the "non-cementitious" material employed by us is charcterized by the fact that it becomes coherent only upon subjection thereof to a molding pressure, as distinguished from "cementitious" materials which are self-setting, or the particles of which are adapted to cohere in the absence of a molding pressure. Moreover, the gist of our invention resides in utilization of the expanding quality of our "non-cementitious" material, when treated as herein described, to provide an internally generated pressure for effecting molding of the mass when confined in a mold of predetermined size.

What I claim as new and desire to secure by Letters Patent is:

1. The process which comprises converting a granular fused oxide into a hydroxide while opposing the expansive forces produced therein to provide a coherent mass and then reconverting the product to its original chemical state while maintaining cohesion of its particles.

2. A molded mass of particles of magnesium oxide cohering as a result of action of pressure chemically generated in the mass.

3. The process which comprises placing a quantity of magnesium oxide in a mold of predetermined dimensions, then causing a hydration reaction between said magnesium oxide and water alone, utilizing the internally generated pressure of such hydration reaction to effect molding of the resulting magnesium hydroxide into a coherent mass, and then reconverting said molded mass to the oxide state.

4. A self-molded mass of particles of magnesium oxide cohering as a result of action of pressure chemically generated by hydration of a mass of fused magnesium oxide while confined in a mold, said molded mass being in a dehydrated condition.

5. A molded mass of non-cementitious material consisting of magnesium oxide, the particles of which have a relation resulting solely from a molding pressure chemically generated in a mass of fused magnesium oxide by hydration thereof while confined in a mold, and such molded mass being in a dehydrated condition.

6. The process of molding loose non-cementitious material comprising granular fused magnesium oxide which consists in placing the same in a mold and hydrating the material to thereby produce within the resulting mass pressures tending to expand such mass beyond the limits defined by the mold, utilizing such pressures in the absence of pressure externally applied to effect rearrangement and cohesion of the particles of the mass, and then dehydrating the mass while maintaining cohesion of its particles.

7. The process which consists in confining a quantity of granular fused magnesium oxide in a given space and converting the same into a hydroxide state with a consequent tendency to produce a mass of greater proportions than the space in which the mass is confined, such conversion being effected in the absence of pressure externally applied, and then heating the confined mass to reconvert the same to the oxide state.

In witness whereof, we have hereunto subscribed our names.

LINWOOD T. RICHARDSON.
EDGAR M. SCHMIEL.